US00RE49499E

(19) United States
(12) Reissued Patent
Chiu

(10) Patent Number: US RE49,499 E
(45) Date of Reissued Patent: Apr. 25, 2023

(54) BALL CHAIR

(71) Applicant: Famosa Corp., Changhua (TW)

(72) Inventor: Hsi-Piao Chiu, Changhua (TW)

(73) Assignee: Famosa Corp., Changhua (TW)

(21) Appl. No.: 17/212,724

(22) Filed: Mar. 25, 2021

Related U.S. Patent Documents

Reissue of:
(64) Patent No.: 10,279,211
Issued: May 7, 2019
Appl. No.: 15/438,780
Filed: Feb. 22, 2017

(51) Int. Cl.
*A63B 21/008* (2006.01)
*A63B 23/02* (2006.01)
(Continued)

(52) U.S. Cl.
CPC ..... *A63B 21/0085* (2013.01); *A47C 3/30* (2013.01); *A47C 3/40* (2013.01); *A47C 9/002* (2013.01);
(Continued)

(58) Field of Classification Search
CPC ..... A63B 21/0085; A63B 21/4027; A63B 21/1609; A63B 21/068; A63B 26/003; A63B 41/125; A63B 41/00; A63B 47/00; A63B 43/00; A63B 2225/093; A63B 2208/0233; A63B 2210/02; A63B 2210/58; A63B 2071/025; A47C 3/16; A47C 3/20; A47C 3/40; A47C 3/30; A47C 9/002; A47C 9/02; A47C 7/004; A47C 7/002; A47C 7/021
See application file for complete search history.

(56) References Cited

U.S. PATENT DOCUMENTS 4,220,307 A * 9/1980 Hale ..... A61B 90/60 248/404
5,078,351 A * 1/1992 Gualtieri ..... A47C 3/30 248/404
(Continued)

FOREIGN PATENT DOCUMENTS

AT 18 U1 * 10/1994
AT 1995 U1 * 3/1998
(Continued)

OTHER PUBLICATIONS

Espacenet Machine translation of Abstract for CN2691378Y, Apr. 13, 2005.
(Continued)

*Primary Examiner* — Patricia L Engle

(57) ABSTRACT

A ball chair may comprise a chair frame, a ball body and an adjusting unit. The chair frame has a connecting base and a legs base, and a supporting column formed therebetween is configured to achieve a telescopic action thereby adjusting a height of the ball chair. The connecting base is formed in a concave shape to form a housing space therein, and an annular frame is formed at an upper end of the connecting base. The ball body is configured to be coupled on the connecting base of the chair frame, and the annular frame is configured to couple with an outer periphery of the ball body thereby limiting a position thereof. As a result, the ball chair is suitable for different statures of users and enables the users to sit thereon for training or rehabilitation.

17 Claims, 12 Drawing Sheets

(51) Int. Cl.

| | |
|---|---|
| ***A63B 26/00*** | (2006.01) |
| ***A47C 3/40*** | (2006.01) |
| ***A63B 41/00*** | (2006.01) |
| ***A47C 3/30*** | (2006.01) |
| ***A63B 21/00*** | (2006.01) |
| ***A47C 9/00*** | (2006.01) |
| *A63B 21/16* | (2006.01) |
| *A63B 21/068* | (2006.01) |
| *A63B 41/08* | (2006.01) |
| *A63B 43/00* | (2006.01) |
| *A63B 47/00* | (2006.01) |
| *A63B 71/02* | (2006.01) |

(52) U.S. Cl.

CPC ..... *A63B 21/4027* (2015.10); *A63B 23/02* (2013.01); *A63B 26/003* (2013.01); *A63B 41/125* (2020.08); *A63B 21/068* (2013.01); *A63B 21/1609* (2015.10); *A63B 41/08* (2013.01); *A63B 43/00* (2013.01); *A63B 47/00* (2013.01); *A63B 71/023* (2013.01); *A63B 2071/025* (2013.01); *A63B 2208/0233* (2013.01); *A63B 2210/02* (2013.01); *A63B 2210/50* (2013.01); *A63B 2210/58* (2013.01); *A63B 2225/093* (2013.01)

(56) References Cited

U.S. PATENT DOCUMENTS

| | | | | | |
|---|---|---|---|---|---|
| 5,690,389 | A * | 11/1997 | Ekman | A47C 3/16 | 248/599 |
| 6,447,070 | B1 | 9/2002 | Ekman | | |
| 6,702,388 | B1 | 3/2004 | Chiu | | |
| 6,730,005 | B1 * | 5/2004 | Liao | A47C 9/002 | 482/147 |
| 6,832,817 | B1 | 12/2004 | Chiu | | |
| D503,553 | S | 4/2005 | Chiu | | |
| 7,044,558 | B2 * | 5/2006 | Chiu | A47C 4/54 | 297/217.1 |
| 7,140,677 | B1 | 11/2006 | Chiu | | |
| D536,542 | S | 2/2007 | Chiu | | |
| 9,415,276 | B1 | 8/2016 | Hao | | |
| 9,919,185 | B1 * | 3/2018 | Qiubo | A63B 24/0062 | |
| 2003/0195098 | A1 | 10/2003 | Hsu | | |
| 2004/0245838 | A1 * | 12/2004 | Chiu | A63B 41/125 | 297/452.41 |
| 2004/0256532 | A1 * | 12/2004 | Liao | A47C 3/16 | 248/346.01 |
| 2006/0131942 | A1 * | 6/2006 | King | A47C 3/30 | 297/344.12 |
| 2007/0102979 | A1 * | 5/2007 | Tedesco | A47C 3/30 | 297/461 |
| 2011/0028291 | A1 * | 2/2011 | Signorile | A63B 26/003 | 482/142 |
| 2011/0226925 | A1 * | 9/2011 | Tsai | A47C 7/5064 | 248/411 |
| 2013/0037185 | A1 * | 2/2013 | Hubbell | A45C 13/42 | 150/106 |
| 2013/0154333 | A1 * | 6/2013 | Wu | A47C 4/03 | 297/452.23 |
| 2014/0210249 | A1 * | 7/2014 | Barnett | A47C 4/54 | 297/452.41 |
| 2016/0236042 | A1 | 8/2016 | Hao | | |
| 2017/0013963 | A1 * | 1/2017 | Keilhauer | A47C 3/18 | |
| 2017/0066121 | A1 * | 3/2017 | Huang | A47C 7/62 | |

FOREIGN PATENT DOCUMENTS

| | | | | | |
|---|---|---|---|---|---|
| CN | 2691378 | Y | 4/2005 | | |
| CN | 204072660 | U | 1/2015 | | |
| CN | 105078063 | A | 11/2015 | | |
| DE | 19701408 | C1 * | 5/1998 | A47C 9/002 | |
| EP | 0870444 | A2 | 10/1998 | | |
| GB | 2508037 | A * | 5/2014 | A47C 4/54 | |
| JP | 1994009537 | U | 2/1994 | | |
| JP | 2015154876 | A | 8/2015 | | |
| TW | M240145 | U | 8/2004 | | |
| TW | 200711601 | A | 4/2007 | | |
| TW | 201622616 | A | 7/2016 | | |
| WO | WO-2005072563 | A1 * | 8/2005 | A47C 1/023 | |

OTHER PUBLICATIONS

Espacenet Machine translation of Abstract for CN105078063A, Nov. 25, 2015.

Espacenet Machine translation of Abstract for CN204072660U, Jan. 7, 2015.

Espacenet Machine translation of Abstract for EP0870444A2, Oct. 14, 1998.

Japanese Patent Office Machine Translation for JP1994009537U, Feb. 8, 1994.

Espacenet Machine translation of JP2015154876A, Aug. 27, 2015.

Espacenet Machine translation of TW200711601A, Apr. 1, 2007.

Espacenet Machine translation of Abstract for TW201622616A, Jul. 1, 2016.

Machine Translation for TWM240145U, Aug. 11, 2004.

* cited by examiner

BALL CHAIR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a reissue application of U.S. Pat. No. 10,279,211, issued May 7, 2019, from U.S. patent application Ser. No. 15/438,780, filed on Feb. 22, 2017, the contents of which are incorporated herein by reference.*

FIELD OF THE INVENTION

The present invention relates to a ball chair more particularly to a ball chair suitable for different statures of users.

BACKGROUND OF THE INVENTION

Generally, a conventional ball chair comprises a chair base, and a ball body is connected to the chair base. Wherein the chair base formed integrally has a ring support, and a plurality of chair legs respectively protrude from the ring support. Moreover, the ball body is installed on the ring support, and a diameter of the ball body is larger than the ring support, thus completing the assembly of the ball chair which is configured to correct sitting posture or achieve physical training for a user.

However, the conventional ball chair is disadvantageous because: (i) when used, a height of the integrated conventional ball chair cannot be adjusted according to a user's statures, thus lowering the practicability thereof; and (ii) the ball body is only supported by the ring support, when a downward pressure is gradually increased, the ball body is configured to be deformed and detached from the ring support, thus increasing the risk of use. Therefore, there remains a need for a new and improved design for a ball chair to overcome the problems presented above.

SUMMARY OF THE INVENTION

The present invention provides a ball chair which comprises a chair frame, a ball body and an adjusting unit. The chair frame has a connecting base and a legs base, and a supporting column formed therebetween is configured to achieve a telescopic action thereby adjusting a height of the ball chair. Moreover, the supporting column has an abutting portion formed at an upper end thereof, and the adjusting unit pivotally connected to the connecting base is configured to abut against the abutting portion thereby achieving the telescopic action. The connecting base is formed in a concave shape to form a housing space therein, and an annular frame is formed at an upper end of the connecting base. The ball body is configured to be coupled on the connecting base of the chair frame, and, by coupling with an outer periphery of the ball body, the annular frame is configured to limit a position of the ball body.

Comparing with conventional ball chair, the present invention is advantageous because: (i) the chair frame has the connecting base and the legs base, and the supporting column is formed therebetween to achieve telescopic action, thus enabling the ball chair to adjust the height thereof according to different statures of users; (ii) the ball chair of the present invention is easy for assembly or disassembly, which is convenient for packaging, carry and storage, and reduces the costs of shipping and manufacturing; and (iii) the connecting base is cooperated with the annular frame to limit the position of the ball body, which improves the safety of use and stability of the ball chair when a user is sitting thereon.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
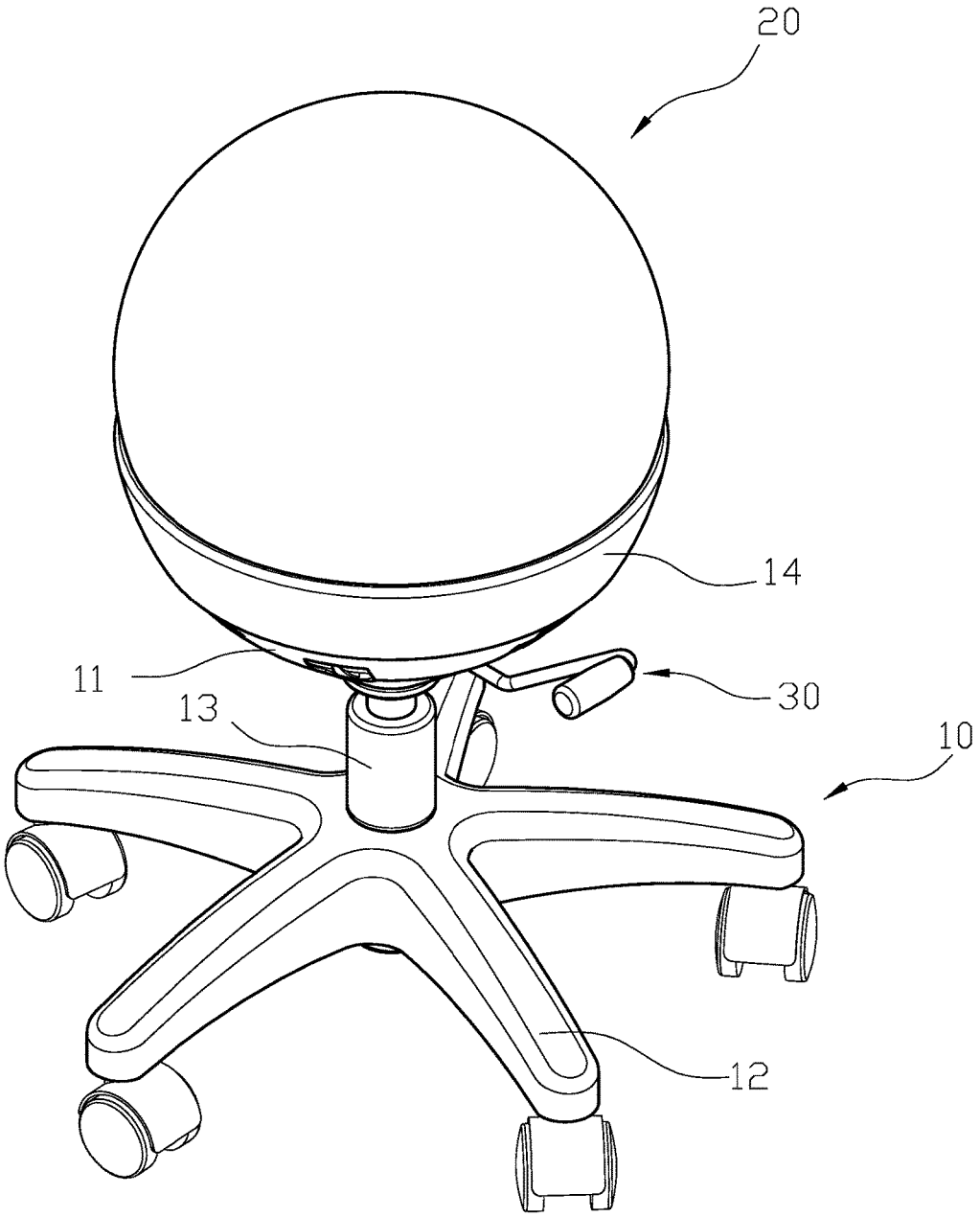
FIG. 1 is a three-dimensional assembly view of a ball chair of the present invention.
Figure 2:
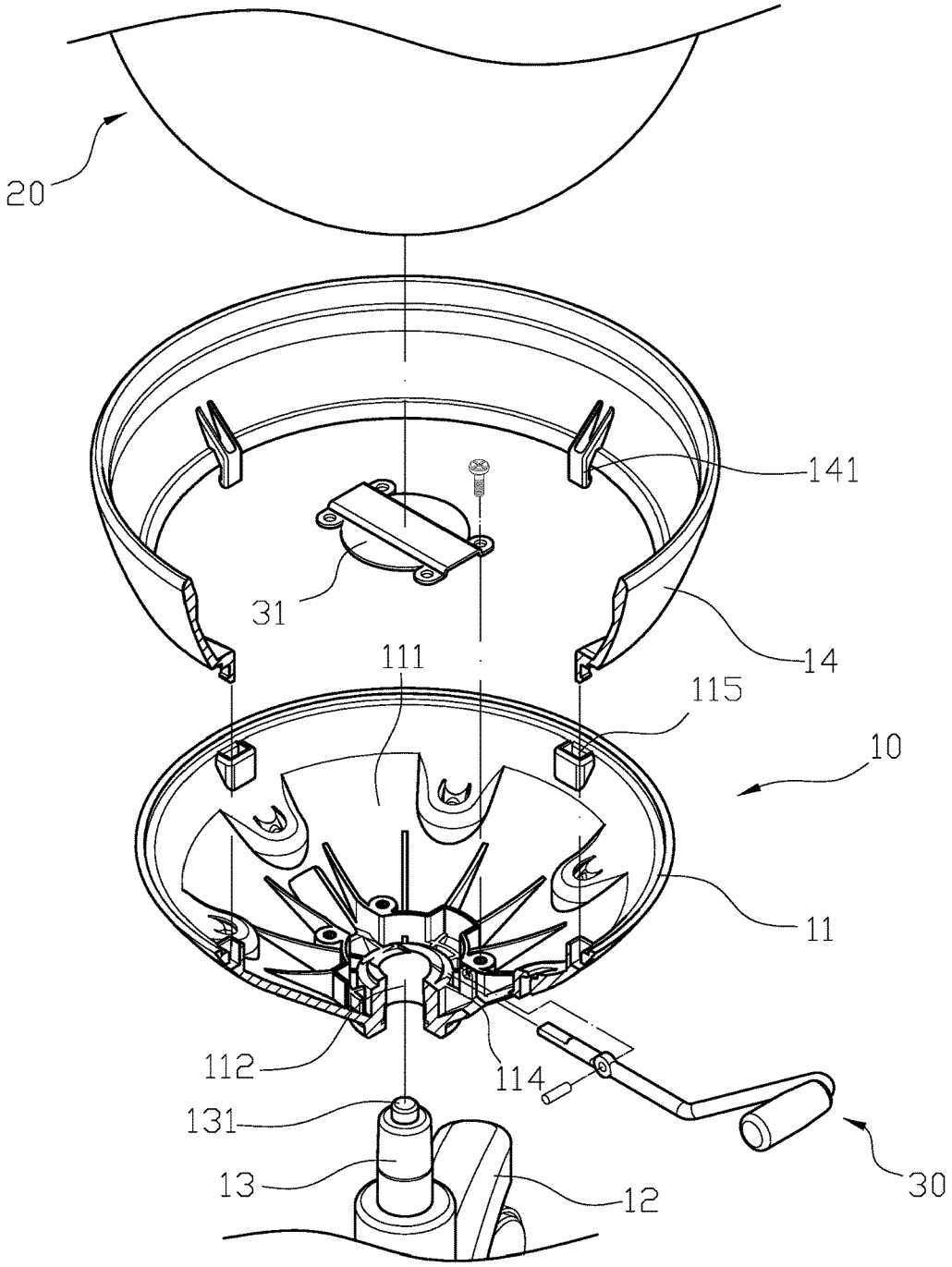
FIG. 2 is an exploded view of the ball chair of the present invention.
Figure 3:
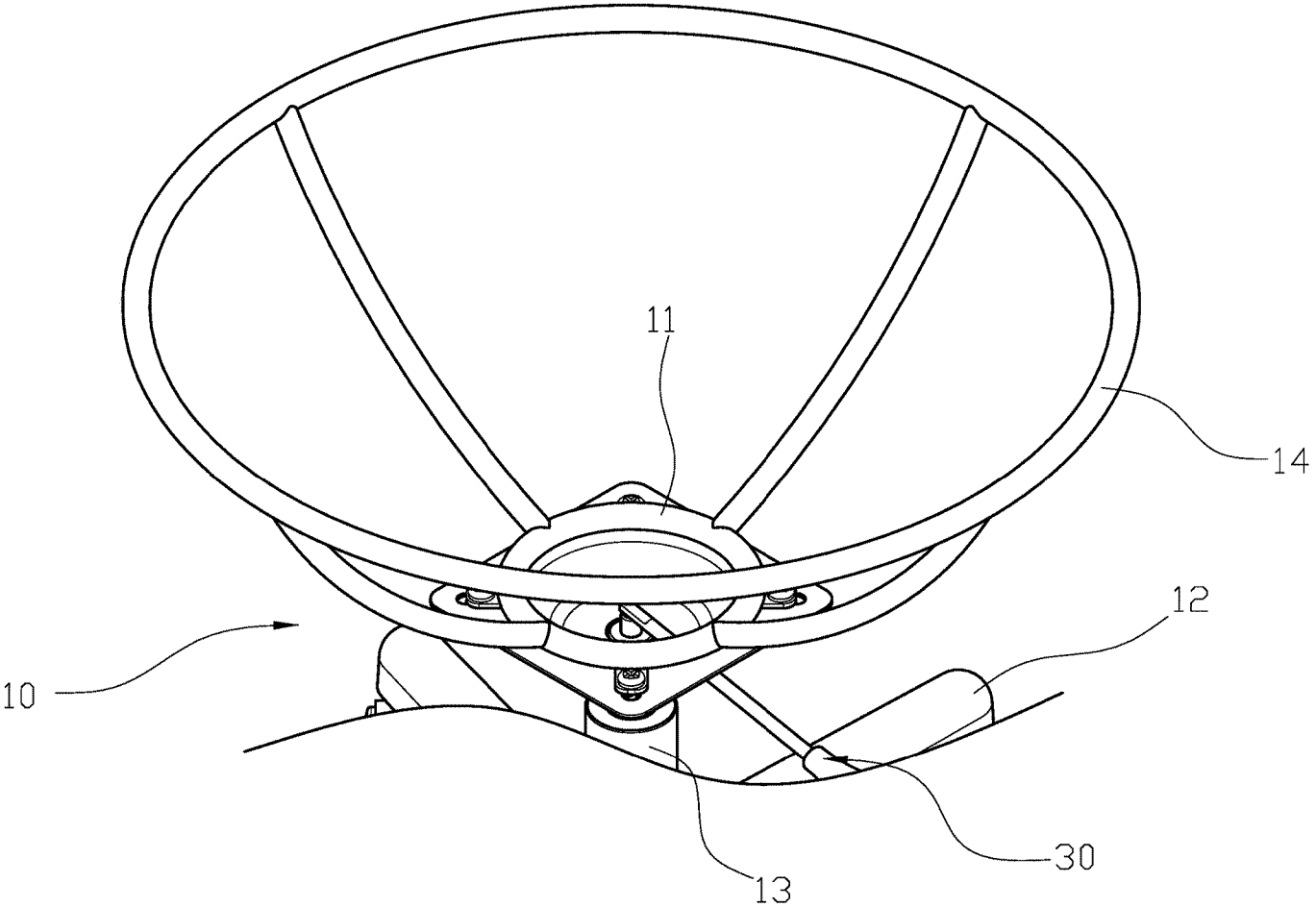
FIG. 3 is a schematic view illustrating a connecting base of the ball chair of the present invention is formed integrally.

In order to further understand the goal, characteristics and effect of the present invention, a number of embodiments along with the drawings are illustrated as following:

Referring to FIGS. 1, 2, 4 and 5, the present invention provides a ball chair which comprises a chair frame (10), a ball body (20) and an adjusting unit (30). The chair frame (10) has a connecting base (11) and a legs base (12), and a supporting column (13) formed therebetween is configured to achieve a telescopic action thereby adjusting a height of the ball chair. Moreover, the supporting column (13) has an abutting portion (131) formed at an upper end thereof, and the adjusting unit (30) pivotally connected to the connecting base (11) is configured to abut against the abutting portion (131) thereby achieving the telescopic action. The connecting base (11) formed in a concave shape to form a housing space (111) therein, and a first connecting slot (112) formed at a central bottom portion thereof is pivotally connected to the upper end of the supporting column (13). Furthermore, an metal ring (113) is coupled with an inner wall of the first connecting slot (112), and at least an opening (114) formed at a bottom portion of the connecting base (11) is located adjacent to the first connecting slot (112) and configured to enable the adjusting unit (30) to install therein. Also, an annular frame (14) is formed at an upper end of the connecting base (11). In one embodiment, the annular frame (14) and the connecting base (11) are formed integrally (as shown in FIG. 3); and in another embodiment, the annular frame (14) and the connecting base (11) are assembled together. A plurality of engaging slots (115) evenly located inside the housing space (111) of the connecting base (11), and a plurality of engaging members (141) respectively protrude from an inner wall of the annular frame (14) toward a bottom end thereof. Through engaging the engaging members (141) with the engaging slots (115), the annular frame (14) is configured to be secured on the upper end of the connecting base (11). The ball body (20) is configured to be coupled on the connecting base (11) of the chair frame (10), and, by coupling with an outer periphery of the ball body (20), the annular frame (14) is configured to limit a position of the ball body (20). The adjusting unit (30) formed in a shank shape has an end which is inserted into the opening (114) to pivotally connect with the connecting base (11), and the end of the adjusting unit (30) extended to an upper end of the first connecting slot (112) is configured to couple with the abutting portion (131) of the supporting column (13). In addition, a cover (31) is coupled with a bottom portion of the housing space (111), thus limiting a position of the adjusting unit (30).

Figure 4:
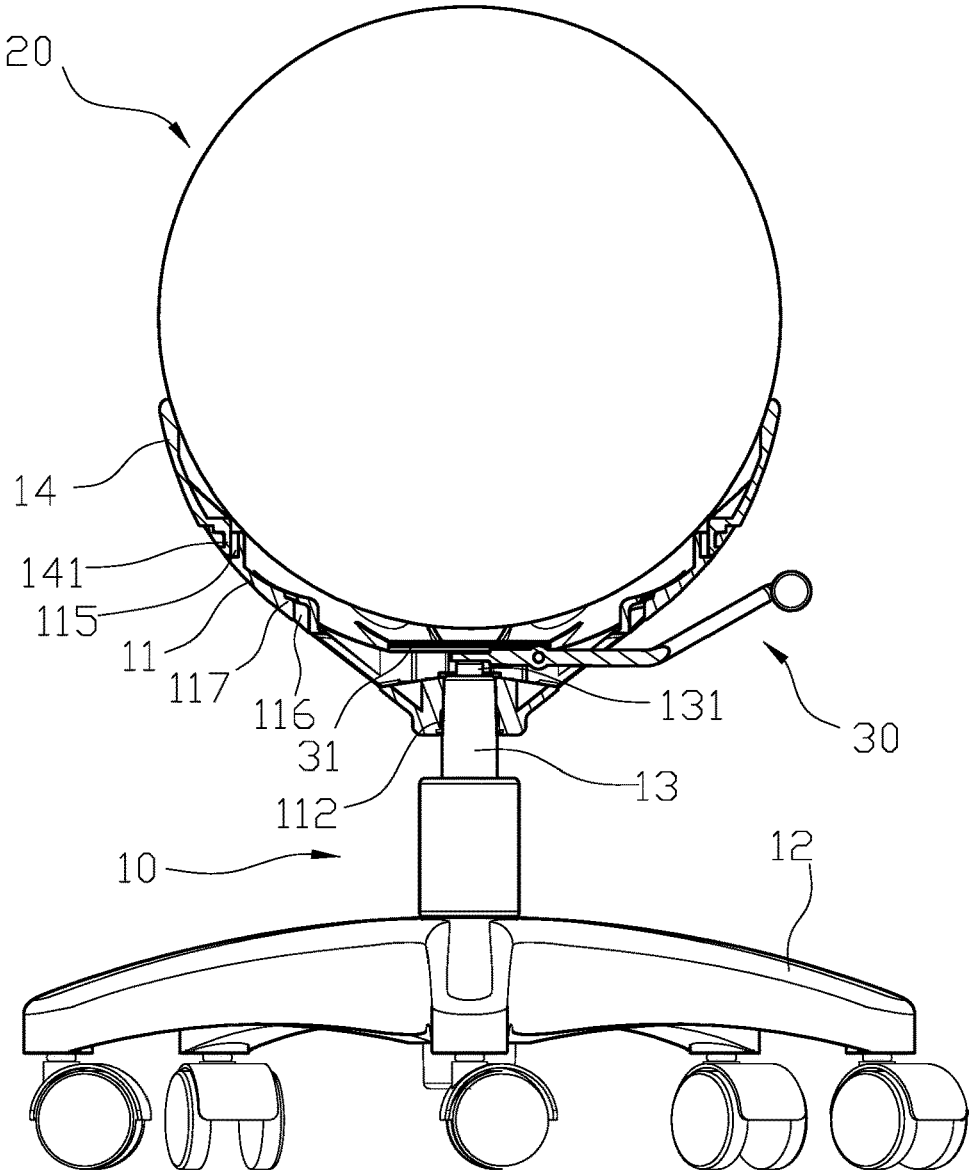
FIG. 4 is a sectional assembly view of the ball chair of the present invention.
Figure 5:
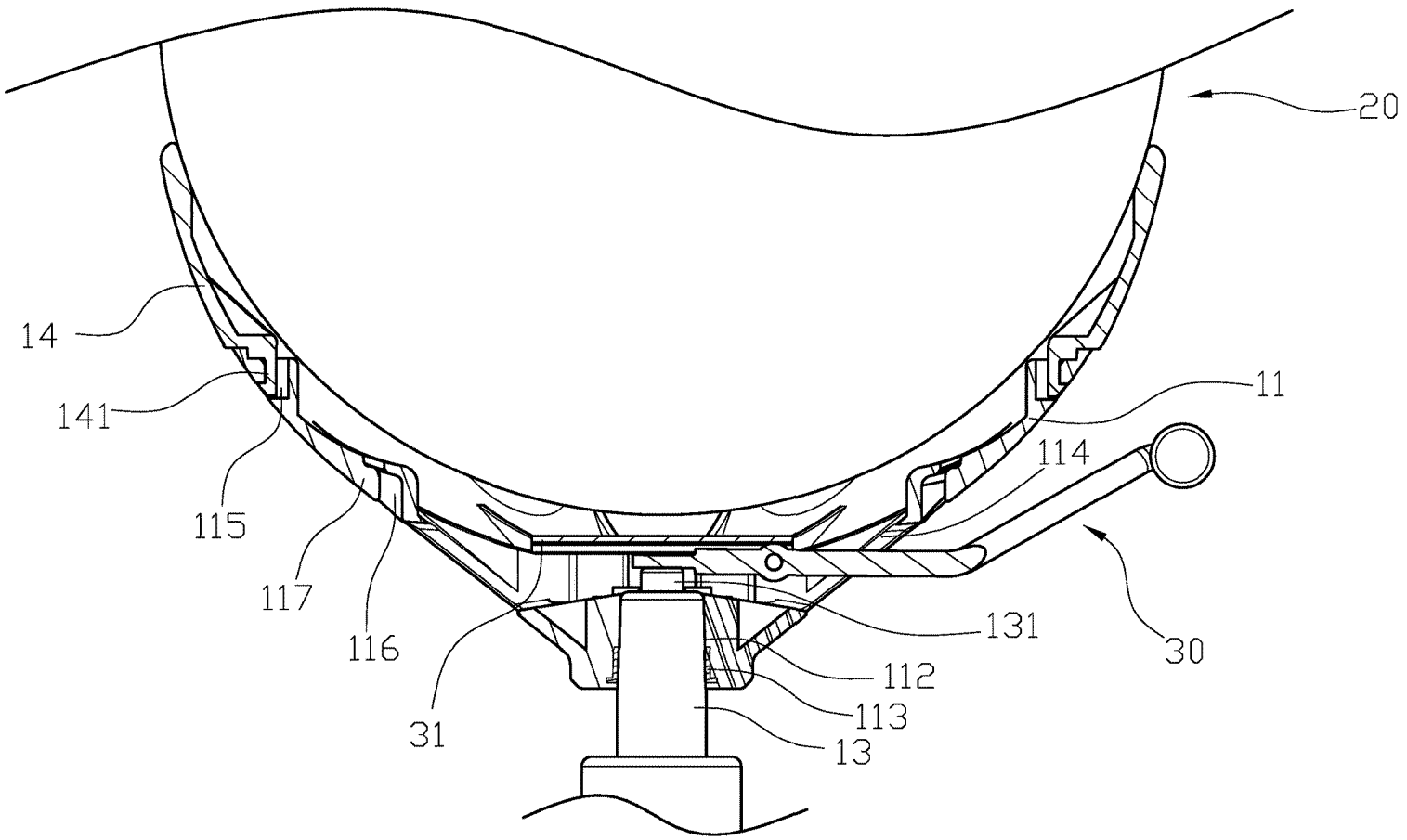
FIG. 5 is a partial enlarged sectional view of the ball chair of the present invention.
Figure 6:
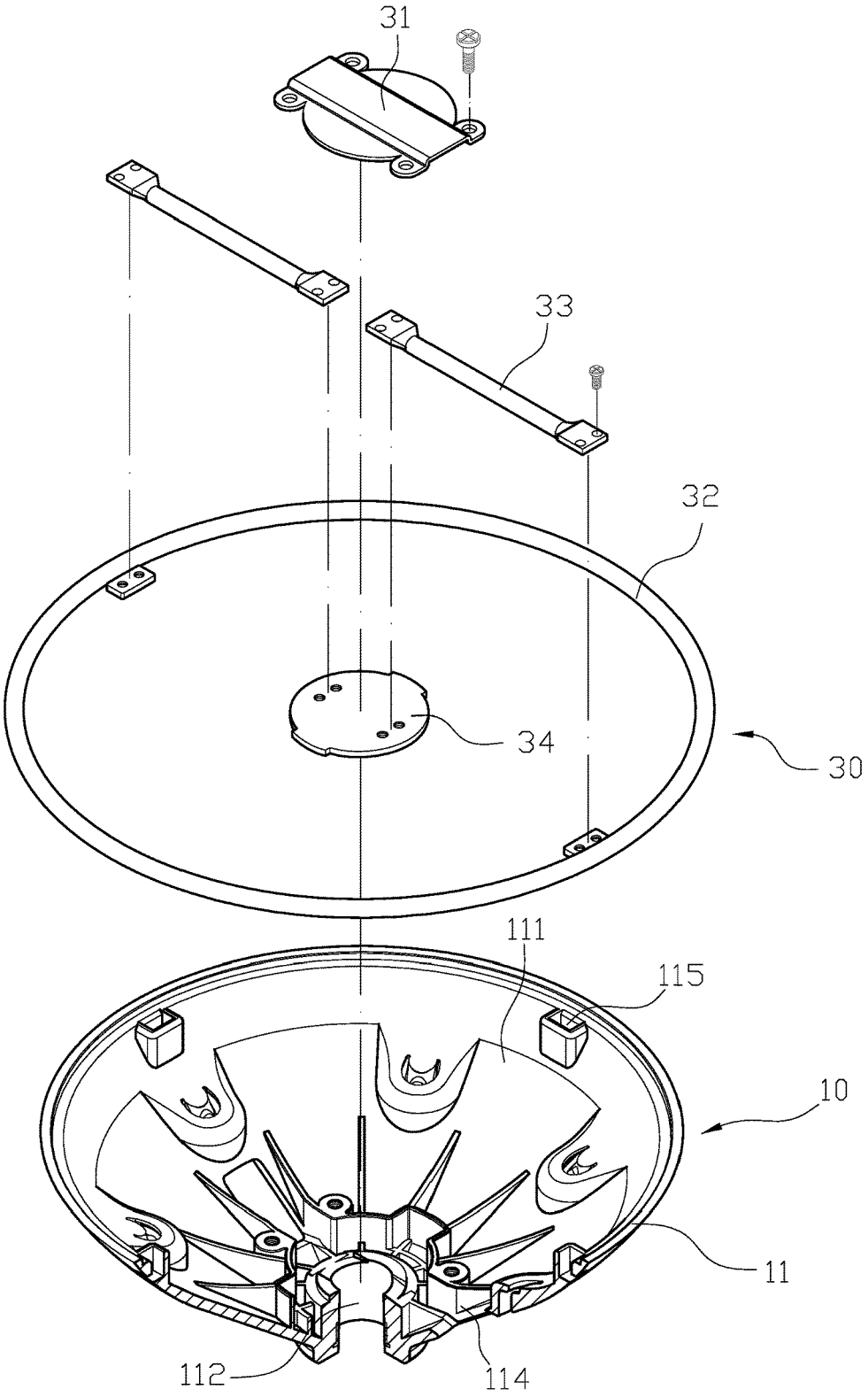
FIG. 6 is an exploded view of a second embodiment of the ball chair of the present invention.
Figure 7:
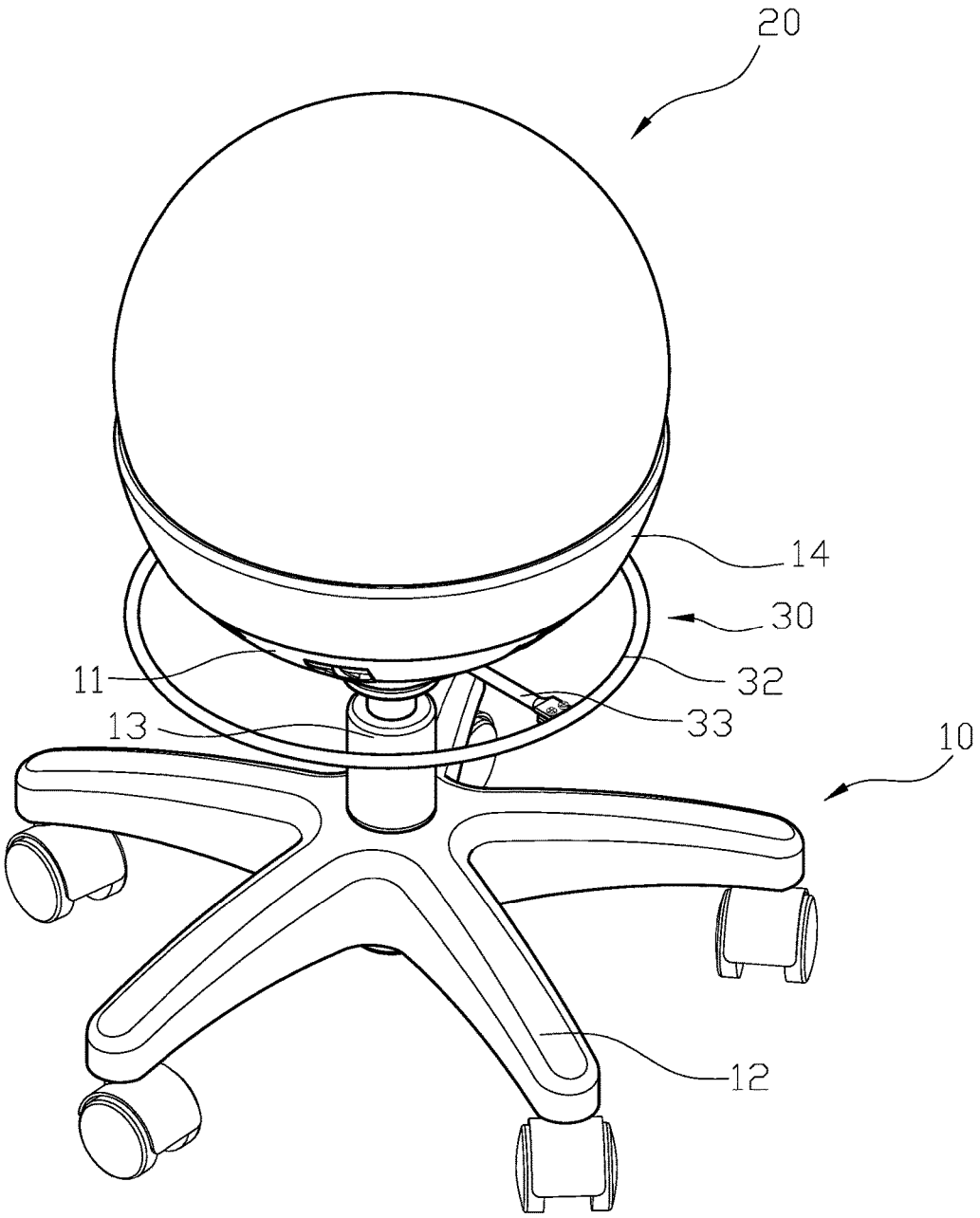
FIG. 7 is a three-dimensional assembly view of the second embodiment of the ball chair of the present invention.
Figure 8:
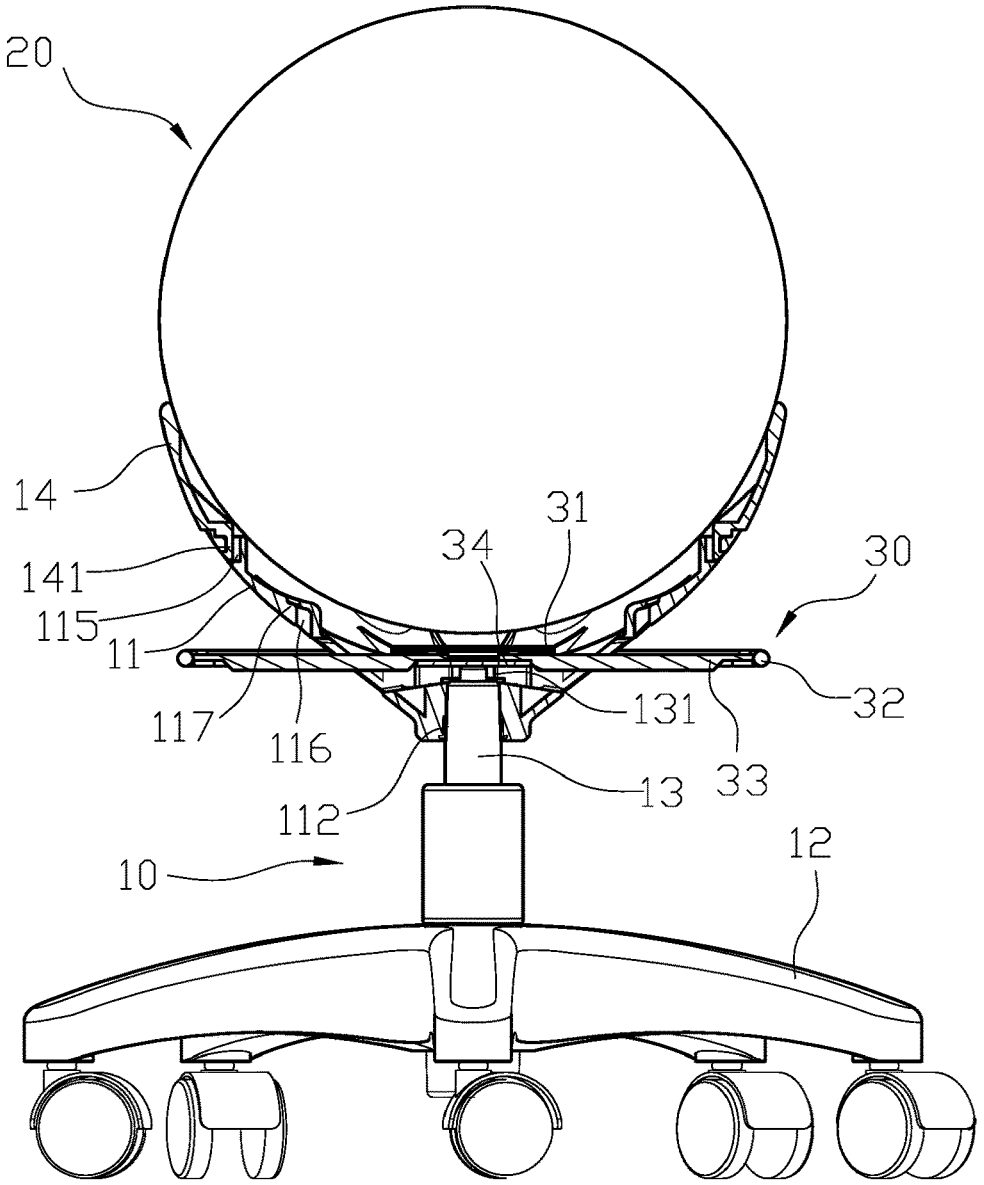
FIG. 8 is a sectional assembly view of the second embodiment of the ball chair of the present invention.
Figure 9:
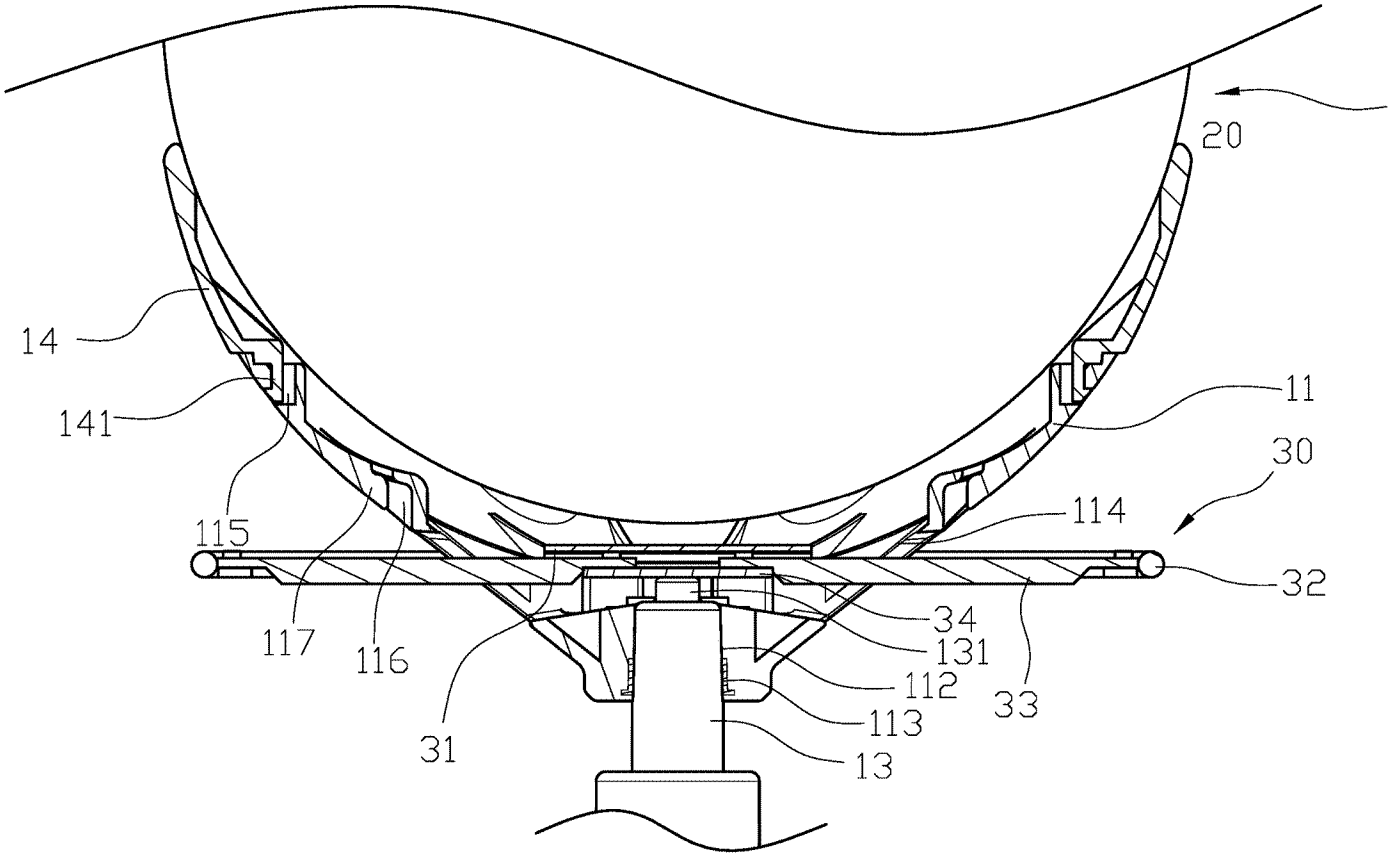
FIG. 9 is a partial enlarged sectional view of the second embodiment of the ball chair of the present invention.

In actual application, referring to FIGS. 4 and 5, the ball chair of the present invention has the ball body (20) for a user to sit thereon, a surface of the ball body (20) is formed in an arc shape which is configured to not only correct sitting posture, relieve pains in the back and waist and recover spine injury for user, but also to train user's balance ability, core muscles and physical coordination. Moreover, with stronger core muscles, the user is configured to improve his/her sitting and standing postures, have better sense of balance, and reduce chances to hurt his/her back. The chair frame (10) comprises the supporting column (13) formed between the legs base (12) and the connecting base (11), and the adjusting unit (30) is configured to press the abutting portion (131) of the supporting column (13) to adjust the height of ball chair. When the abutting portion (131) of the supporting column (13) is pressed by the adjusting unit (30) and a down force is smaller than an upward supporting force of the supporting column (13), the connecting base (11) is pushed upwardly by the supporting column (13). Conversely, when the down force is greater than the upper supporting force of the supporting column (13), the connecting base (11) is configured to press the supporting column (13) downwardly. As a result, with telescopic function, the ball chair of the present invention is configured to be adjusted and suitable for different statures of users, thereby improving the practicality thereof. Moreover, when sitting on the ball chair, a user can put his feet on the legs base (12) thereby achieving feet relaxation and postural adjustment.

In another embodiment, referring to FIGS. 6 to 9, the bottom portion of the connecting base (11) has two openings (114) which are symmetrically located adjacent to the first connecting slot (112). The adjusting unit (30) has an annular loop (32), and an inner periphery thereof has at least two connecting rods (33) located at two corresponding positions. Furthermore, each of the two connecting rods (33) comprises an inner edge which is received in an interior space of the connecting base (11) through the corresponding opening (114), and a pressing board (34) is configured to connect with the two connecting rods (33) and to abut against the abutting portion (131) of the supporting column (13). Then, the cover (31) is coupled with the bottom portion of the housing space (111), thus limiting positions of the two connecting rods (33) and the pressing board (34). As a result, the height of the ball chair can be adjusted by pulling the two connecting rods (33), and the pressing board (34) is configured to press the abutting portion (131) of the supporting column (13), thus achieving adjustments. Moreover, since the two connecting rods (33) are formed at the inner periphery of the annular loop (32), when the annular loop (32) is pulled, the connecting rods (33) are configured to be driven by the annular loop (32) to press the pressing board (34), which enables the adjusting unit (30) more convenient to use.

Figure 10:
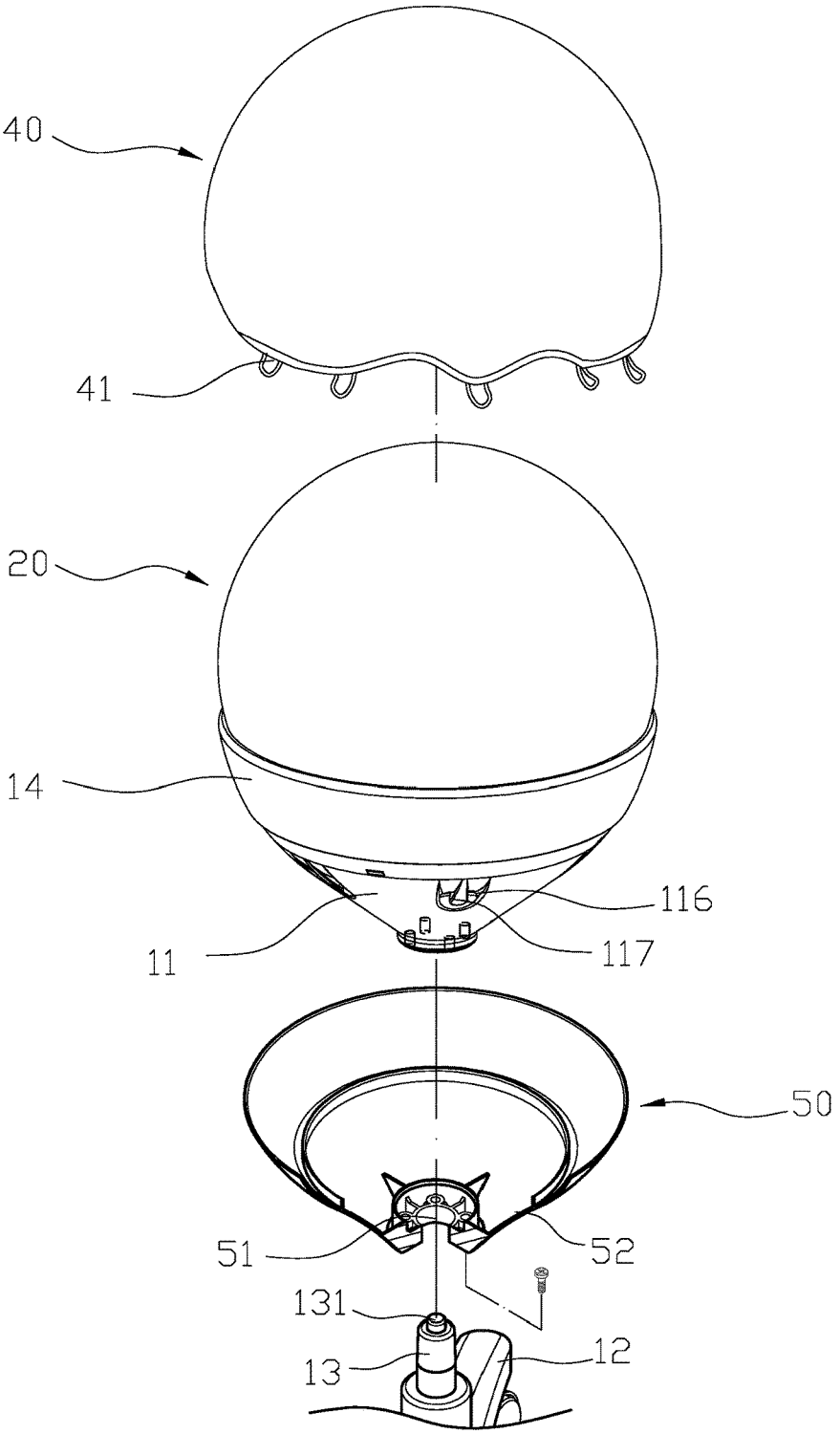
FIG. 10 is an exploded view of a third embodiment of the ball chair of the present invention.
Figure 11:
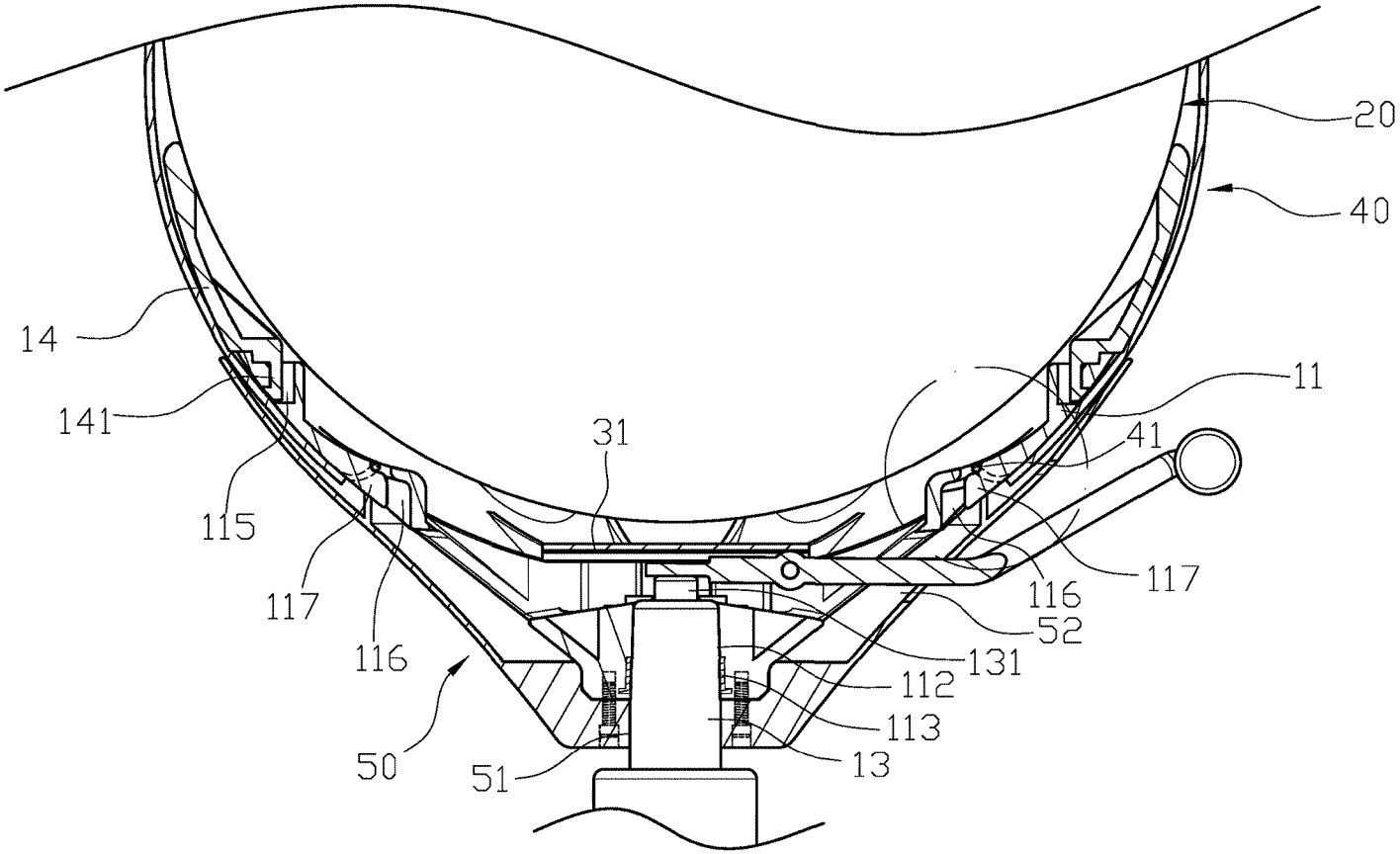
FIG. 11 is a sectional assembly view of the third embodiment of the ball chair of the present invention.
Figure 12:
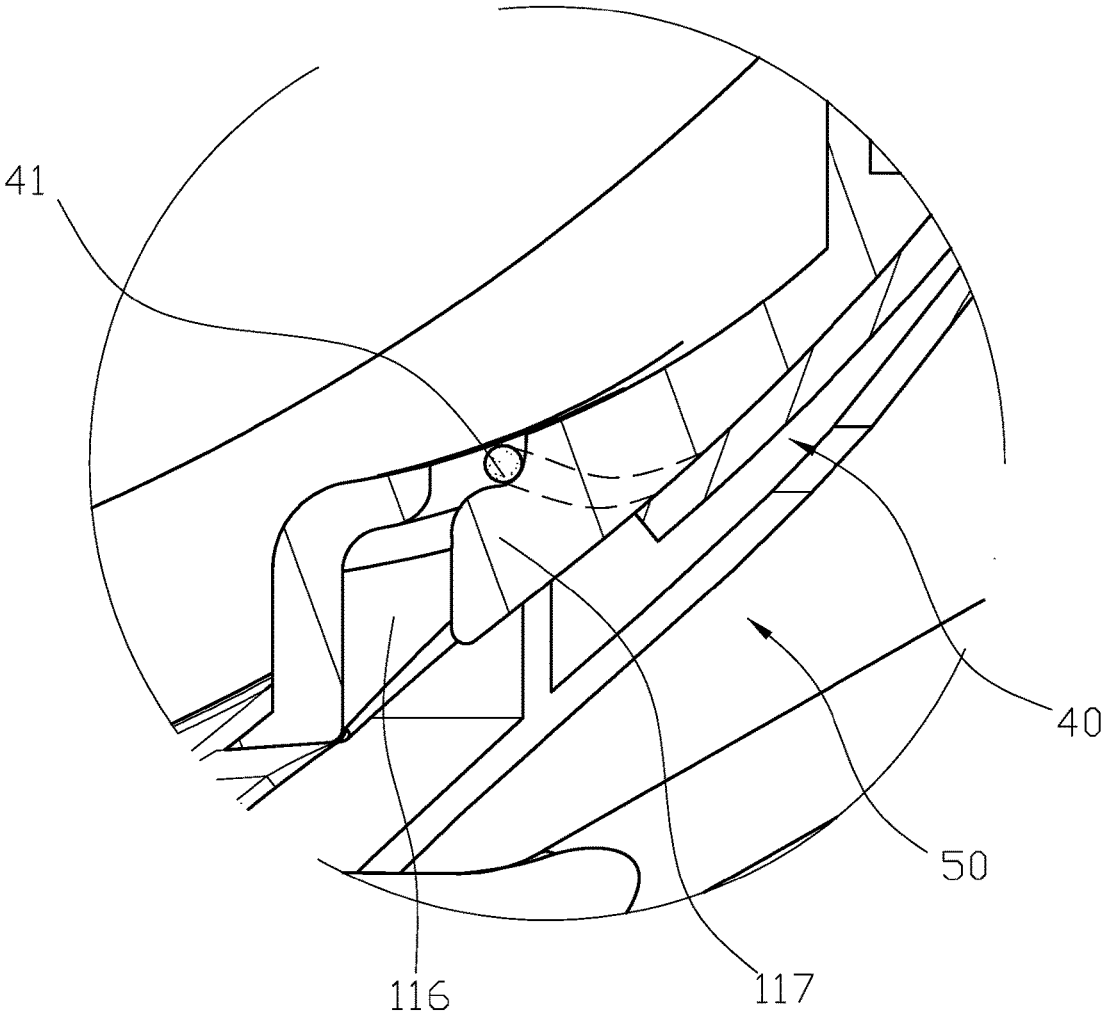
FIG. 12 is a partial enlarged sectional view of the third embodiment of the ball chair of the present invention.

In still another embodiment, referring to FIGS. 10 to 12, the ball chair of the present invention further comprises a cap (40) and a bottom shell (50). The cap (40) having a lower opening is configured to cover the ball body (20) from top to bottom and to engage with the connecting base (11). The bottom shell (50) is disposed from bottom to top to couple with the bottom portion of the connecting base (11) and covers a lower portion of the cap (40). Moreover, the connecting base (11) has a plurality of first slots (116) formed at an outer wall thereof, and each of the first slots (116) comprises a hook member (117). Also, a lower edge of the cap (40) around the lower opening has a plurality of hook rings (41). When the cap (40) downwardly covers the ball body (20), each of the hook rings (41) is configured to be engaged with the hook member (117) of the first slot (116) located at a corresponding position, and, thereafter, the bottom shell (50) is configured to upwardly cover the bottom portion of the connecting base (11), thus completing the installation of the cap (40) and the bottom shell (50). As a result, the ball body (20) and the connecting base (11) are covered by the cap (40) and the bottom shell (50), and the ball body (20) is configured to be secured with the connecting base (11), thus improving the safety of use. In addition, a bottom portion of the bottom shell (50) has a second connecting slot (51) which is communicated with the first connecting slot (112) of the connecting base (11) and penetrated through by the supporting column (13). Furthermore, at least a through hole (52) is formed at a lateral side of the bottom shell (50), and the adjusting unit (30) is configured to pass through the through hole (52) to connect to the connecting base (11).

Comparing with conventional ball chair, the present invention is advantageous because: (i) the chair frame (10) has the connecting base (11) and the legs base (12), and the supporting column (13) is formed therebetween to achieve telescopic action, thus enabling the ball chair to adjust the height thereof according to different statures of users; (ii) the ball chair of the present invention is easy for assembly or disassembly, which is convenient for packaging, carry and storage, and reduces the costs of shipping and manufacturing; and (iii) the connecting base (11) is cooperated with the annular frame (14) to limit the position of the ball body (20), which improves the safety of use and stability of the ball chair when a user is sitting thereon.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A ball chair comprising:

a chair frame having a connecting base and a legs base, and a supporting column which is formed therebetween and configured to achieve a telescopic action; the connecting base formed in a concave shape to form a housing space therein, and an annular frame formed at an upper end of the connecting base; and a ball body configured to couple on the connecting base of the chair frame, and the annular frame configured to couple with an outer periphery of the ball body to limit a position thereof, wherein a first connecting slot *is* formed at a central bottom portion of the connecting base*, the first connecting slot having an inner wall with longitudinal extents from a first end to a second end, and the first connecting slot* is pivotally connected to an upper end of the supporting column; a metal ring is coupled with [an] *the* inner wall of the first connecting slot *and entirely disposed between the first end and the second end of the first connecting slot*, and at least an opening formed at a bottom portion of the connecting base adjacent to the first connecting slot is configured to enable an adjusting unit to install therein; and the supporting column has an abutting portion formed at the upper end thereof, and the adjusting unit is configured to press the abutting portion of the supporting column to achieve the telescopic action.

2. The ball chair of claim 1, wherein a cap having a lower opening is configured to cover the ball body from top to bottom and to engage with the connecting base.

3. The ball chair of claim 2, wherein a bottom shell is disposed from bottom to top to couple with the bottom portion of the connecting base and covers a lower portion of the cap; and a bottom portion of the bottom shell has a second connecting slot which is communicated with the first connecting slot of the connecting base.

4. The ball chair of claim 3, wherein at least a through hole is formed at a lateral side of the bottom shell, and the adjusting unit is configured to pass through the through hole to connect to the connecting base.

5. The ball chair of claim 2, wherein the connecting base has a plurality of first slots formed at an outer wall thereof, and each of the plurality of first slots comprises a hook member; a lower edge of the cap around the lower opening has a plurality of hook rings; and each of the plurality of hook rings is configured to be engaged with the hook member of a respective first slot of the plurality of first slots located at a corresponding position, thus securing a position of the cap.

6. The ball chair of claim 1, wherein the connecting base and the annular frame are formed integrally.

7. The ball chair of claim 1, wherein a plurality of engaging slots evenly located inside the housing space of the connecting base, and a plurality of engaging members respectively protrude from an inner wall of the annular frame toward a bottom end thereof; and through engaging the plurality of engaging members with the plurality of engaging slots, the annular frame is configured to be secured on the upper end of the connecting base.

8. The ball chair of claim 1, wherein the adjusting unit formed in a shank shape and has an end which is inserted into the at least one opening to pivotally connect with the connecting base, and the end of the adjusting unit extended to an upper end of the first connecting slot is configured to couple with the abutting portion of the supporting column; and a cover is coupled with a bottom portion of the housing space, thereby limiting a position of the adjusting unit.

9. The ball chair of claim 1, wherein the at least one opening of the bottom portion of the connecting base comprises two openings which are symmetrically located adjacent to the first connecting slot; the adjusting unit has an annular loop, and an inner periphery thereof has at least two connecting rods located at two corresponding positions; each of the two connecting rods comprises an inner edge which is received in an interior space of the connecting base through a corresponding opening of the two openings, and a pressing board is configured to connect with the two connecting rods and to abut against the abutting portion of the supporting column; and the cover is coupled with the bottom portion of the housing space, thereby limiting positions of the two connecting rods and the pressing board.

*10. A ball chair comprising:*

*a frame defining a concave space configured to accept a ball body, the frame comprising a connecting base, a central region of a bottom portion of the connecting base comprising a first connecting slot with an inner wall having longitudinal extents from a first end to a second end;*

*a legs base;*

*a telescopically adjustable supporting column disposed between the connecting base and the legs base to adjustably change a distance between the connecting base and the legs base, the supporting column comprising an abutting portion for adjusting a height of the supporting column, an upper end of the supporting column pivotally engaged with the first connecting slot;*

*a metal ring coupled with the inner wall of the first connecting slot and entirely disposed between the first end and the second end of the first connecting slot, the supporting column pivotally passing through the metal ring; and*

*an adjusting unit coupled to the connecting base and configured to engage the abutting portion of the supporting column to selectively telescopically adjust the height of the supporting column.*

*11. The ball chair of claim 10 wherein the connecting base is concave and an annular frame portion is coupled to an upper end of the connecting base and configured to couple with an outer periphery of the ball body.*

*12. The ball chair of claim 11, wherein the annular frame portion is connected to the connecting base by way of a plurality of slots and respective engaging members that engage with the slots.*

*13. The ball chair of claim 10 wherein an opening is defined in the connecting base, the adjusting unit passing through the opening, the adjusting unit pivotally engaging with the connecting base, and an end of the adjusting unit engages the abutting portion of the supporting column.*

*14. The ball chair of claim 10, wherein:*

*at least two openings are symmetrically defined in the connecting base;*

*the adjusting unit comprises an annular loop, and at least two connecting rods are coupled to the annular loop and respectively pass through the at least two openings;*

*a pressing board is disposed in the connecting base to engage the abutting portion of the supporting column and is coupled to the at least two connecting rods; and*

*a cover is coupled to the connecting base, an end of each connecting rod sandwiched between the pressing board and the cover.*

*15. The ball chair of claim 10 further comprising a bottom shell coupled to the connecting base, a bottom portion of the bottom shell comprising a second connecting slot in communication with the first connecting slot of the connecting base.*

*16. The ball chair of claim 10 further comprising a cap, the cap configured to cover at least a portion of the ball body, the cap removably couped to the frame.*

*17. The ball chair of claim 16, wherein:*

*the frame comprises a plurality hook members; and*

*the cap comprises a plurality hook rings respectively configured to engage with the hook members.*

* * * * *